United States Patent
Willner et al.

(10) Patent No.: US 7,149,370 B2
(45) Date of Patent: Dec. 12, 2006

(54) METHOD AND DEVICE FOR IMAGE SURFING

(75) Inventors: Kai Willner, Tampere (FI); Fehmi Chebil, Irving, TX (US); Asad Islam, Richardson, TX (US)

(73) Assignee: Nokia Corporation, Espoo (FI)

(*) Notice: Subject to any disclaimer, the term of this patent is extended or adjusted under 35 U.S.C. 154(b) by 11 days.

(21) Appl. No.: 10/385,194

(22) Filed: Mar. 7, 2003

(65) Prior Publication Data

US 2004/0175059 A1 Sep. 9, 2004

(51) Int. Cl.
*G06K 9/60* (2006.01)
(52) U.S. Cl. ................................ 382/305; 382/240
(58) Field of Classification Search ............... 382/305, 382/232–233, 240, 298–299, 282; 709/247, 709/203; 348/333.11, 333.12; 455/412.1, 455/419; 715/700
See application file for complete search history.

(56) References Cited

U.S. PATENT DOCUMENTS

| | | | |
|---|---|---|---|
| 6,363,178 B1* | 3/2002 | Chiba et al. ............... 382/305 |
| 2002/0159653 A1 | 10/2002 | Dekel et al. ............... 382/282 |
| 2003/0018818 A1* | 1/2003 | Boliek et al. ............... 709/247 |
| 2003/0035585 A1* | 2/2003 | Osborne et al. ............ 382/232 |
| 2003/0193603 A1* | 10/2003 | Parulski et al. ........ 348/333.12 |

OTHER PUBLICATIONS

Christopoulos et al., The JPEG 2000 Still Image Coding System: An Overview, IEEE 0098 3063/00, 1103-1124.*
Chebil et al., Compressed Domain Editing of JPEG2000 Images, IEEE Transaction on Consumer Electronics, vol. 51, No. 2, May 2005, pp. 710-717.*
"JPEG 2000 Part I Final Draft International Standard"; ITU-T Rec. T.800 (2000); Annex B—pp. 57-77.

* cited by examiner

*Primary Examiner*—Ishrat Sherali
(74) *Attorney, Agent, or Firm*—Ware, Fressola, Van Der Sluys & Adolphson LLP

(57) ABSTRACT

A method and system for allowing a client to carry out image surfing. After connecting with a server, the client can select an image category of images to surf from. Upon request by the client, the server sends a set of thumbnails of images to the client, allowing the client to specify one of them for surfing. The client has a GUI interface by which the client can move a selection box to select a portion of the specified image for viewing. If the client wishes to zoom in, zoom out, or enhance the quality of the viewed area, the client sends a request to the server so that the server can send the client the necessary image sub-component to achieve the zoomed or enhanced image portion.

12 Claims, 8 Drawing Sheets

| Tile 0 | Tile 1 | Tile 2 | Tile 3 |
|---|---|---|---|
| Tile 4 | Tile 5 | Tile 6 | Tile 7 |
| Tile 8 | Tile 9 | Tile 10 | Tile 11 |
| Tile 12 | Tile 13 | Tile 14 | Tile 15 |
| Tile 16 | Tile 17 | Tile 18 | Tile 19 |

FIG. 1

METHOD AND DEVICE FOR IMAGE SURFING

FIELD OF THE INVENTION

The present invention relates generally to subband decomposition-based image codecs and, more particularly, to accessing and viewing images using a network device.

BACKGROUND OF THE INVENTION

It is generally known that image compression is effective in reducing the amount of image data for transmission or storage. In particular, with the introduction of scalable image coding formats like the JPEG2000, it has become possible to send and receive only a fraction of the image file and still reconstruct a high-quality image at the receiving end. The part that is dropped from the image usually contains information that does not add much improvement in perceptual image quality.

JPEG stands for Joint Photographic Experts Group for image compression. In 1988, this committee adopted its first standard, known as the JPEG baseline, which is based on discrete cosine transform (DCT) and on Huffman coding. In 2001, the JPEG committee developed a new compression standard, named JPEG2000. This new standard provides low bit-rate operation, with rate-distortion and subjective image quality performance superior to existing standards, without sacrificing performance at other points in the rate-distortion spectrum. More importantly, JPEG2000 allows extraction of different resolutions and pixel fidelities of a compressed image from the same codestream representation. It also offers features such as region-of-interest (ROI) coding and random access to image areas. This allows a user to manipulate, store or transmit only the essential information of an image for any target device from its JPEG2000 bitstream representation.

JPEG2000 is a subband decomposition-based bit-plane coder. It uses wavelets at the transform stage. The image is decomposed to multiple resolutions. Each resolution is composed of subbands representing low and/or high frequency components. The samples in the subbands are then coded in bit-planes starting from the most significant bit-plane. The usage of the wavelet transform and the bit-plane coding scheme provide the scalability features of JPEG2000, including the scalability of quality, resolution and color components of the image.

With the advent of multimedia communications devices, the realm of multimedia content has penetrated the mobile market. Still imaging is among the foremost driving member of this gamut of multimedia content. While most of the still images on multimedia communications devices are stored in the existing JPEG format, the new JPEG2000 standard will make its way into these devices. Thus, it is imperative that the JPEG2000 standard is supported by these communications devices. It is even more important to develop applications for such devices that exploit the features in the JPEG2000 standard.

Image Surfing is a method by which still images are viewed in a mobile device, one portion of the image at a time, as if the user is surfing the image. Viewing a full resolution image is generally not possible in the mobile terminal device as the display size is small, and the bandwidth and processing power of such a device is not high enough to make such a process practical. Image Surfing makes it possible to view the image at its original resolution but in bits and pieces. As such, the mobile device, which is a client, communicates with an image server so that the server sends the relevant data of the image to the client.

While the Image Surfing application is useful, it has some inherent limitations due to the nature of the wireless communications involved. Whenever the user wishes to view a new portion of the image, the client sends a request to the server indicating that new portion. Depending on the network conditions, a considerable amount of time may elapse before the request is served. This may cause inconvenience to the user as a significant amount of time may be lost.

Other types of clients, such as pocket PCs, communicators, and imaging phones, also share the inherent limitations due to the nature of wireless communications.

As mentioned earlier, it is impractical, if not impossible, to display high-quality, high resolution images at their original resolution and quality. However, if quality and resolution can be comprised, a client wishing to download a very large image has a limited number of options.

Two popular solutions that have been used on the Internet for low-memory, low-bandwidth clients can be applied to mobile multimedia devices. The first solution is to download a "thumbnail" version of the original image. It should be noted that the thumbnail is a separate image that has a much smaller resolution than the original image and, therefore, is of a practical size for the client to download and decode. However, the resolution of a thumbnail is much lower than the original image, making it extremely difficult, if not impossible, to view the details in the image carried in the thumbnail. The second solution is to download and decode only a part of the code-stream. But that can only be done if the image has been compressed with a codec that supports progressive decoding. Even with this method, the visual quality of the image is much lower and the details may also be difficult to view.

Alternatively, if the image has not been compressed with a codec that supports progressive decoding, the server can encode the image at a very low bit rate so that it can be transmitted to the client. However, the quality issue still remains because a low bit rate image will have poor visual quality. In other words, none of above-mentioned solutions brings satisfactory results to the consumers. These solutions compromise either quality or resolution—the two single most important characteristics of high-quality, high-resolution images.

In prior art, a FlashPix format is used to overcome the above-mentioned problems. The FlashPix format forms a pyramidal multi-resolution representation of the image. With that format, each resolution is divided into squares or rectangular areas and each area is coded independently by JPEG baseline. The problem with this approach is that the sever needs to have many different code-streams of the same single image, each code-stream corresponding to a different resolution. When the server is host to thousands and thousands of images, the task would become unmanageable.

It is thus advantageous and desirable to provide a method and system to improve visual quality of images provided by a server and displayed by a client in a low-memory and low bandwidth environment.

SUMMARY OF THE INVENTION

The present invention provides a method of conveying image data of an image having an initial quality in a codestream between a source and a target in a wireless communications network, where the target has a memory means to store at least a portion of the image conveyed in the codestream. The method comprises the steps of:

selecting in the target a subimage part of said image for display at an increased quality level greater than said initial quality of the image stored in the memory means, wherein the image is composed of a plurality of image tiles, each image tile comprising a plurality of tile sub-components, and providing a message to the source from the target indicative of an increased amount of tile sub-components of one or more of said tiles needed from the source in order to achieve the increased quality level of the selected subimage part of said image so as to allow the source to convey further image data of the image in the codestream including the increased amount of tile sub-components in response to the message.

Preferably, the image having said initial quality stored in the memory device comprises a thumbnail version of the image, and the method further comprises the step of displaying the thumbnail version of the image so as to allow the target to carry out said selecting step based on the displayed image.

Furthermore, the image data comprises a plurality of thumbnail versions of a corresponding plurality of images having said initial quality, said method further comprising the step of displaying the plurality of thumbnail versions in the target for permitting the target to carry out said steps of selecting a subimage part and providing a message with respect to any one or more of said plurality of images. The corresponding plurality of images belong to one of a plurality of image categories selected in the target. The method further comprises the step of signaling to the source a request indicative of the selected image category so as to allow the source to convey said image data in response to said request.

Advantageously, the plurality of tile sub-components comprise a plurality of image layer components, resolution components, and/or color components.

According to the present invention, the memory means is part of a communication device in the wireless communications network, and the communication device can be a mobile phone.

Advantageously, the method further comprises the steps of specifying in the target an enhanced quality level greater than said increased quality level for displaying the selected subimage part of said image at the enhanced quality level, and providing a further message to the source from the target indicative of a further amount of tile sub-components of said one or more of said tiles needed from the source in order to achieve the enhanced quality level of the selected subimage part so as to the source to convey additional image data of the image in the codestream including the further amount of tile sub-components in response to the further message.

Preferably, the method further comprises the steps of:

specifying in the target a further subimage part of said image for display at said increased quality level, wherein said specified further subimage part is at least partially different from the selected subimage part, and providing a further message to the source from the target indicative of a further amount of tile sub-components of one or more of said tiles needed from the source in order to achieve said increased quality of the specified further subimage part so as to allow the source to convey additional image data of the image in the codestream including the further amount of tile sub-components in response to the further message.

According to the present invention, the codestream comprises a plurality of JPEG2000 packets containing the image data.

The present invention also provides an image surfing system to be used in a wireless communications network comprising at least a source and a target, wherein the source is capable of conveying image data of an image having an initial quality in a codestream to the target, and the target has a memory means to store at least a portion of the image conveyed in the codestream. The system comprises:

a specifying means in the target to allow the target to specify a subimage part of said image for display at an increased quality level greater than said initial quality of the image stored in the memory means, wherein the image is composed of a plurality of image tiles, each image tile comprising a plurality of tile sub-components, a computing means in the target, responsive to the specified subimage part, for computing an increased amount of tile sub-components of one or more of said tiles needed from the source in order to achieve the increased quality level of the specified subimage part of said image so as to allow the target to provide a message to the source indicative of the increased amount of tile sub-components, and a selecting means in the source, responsive to the message, for selecting further image data of the image including the increased amount of tile sub-components, wherein the selected further image data is conveyed in the codestream to the target.

The present invention further provides a communication device in a wireless communications network comprising at least a source capable of conveying image data of an image having an initial quality in a codestream to the communication device. The communication device comprises:

a memory means to store at least a portion of the image conveyed in the codestream;

a displaying means, operatively connected to the memory means, for displaying part or all of said at least portion of the conveyed image;

a specifying means, operatively connected to the displaying means, for allowing a user to specify from the displayed image a subimage part of the conveyed image for display at an increased quality level greater than said initial quality of the image stored in the memory means, wherein the image is composed of a plurality of image tiles, each image tile comprising a plurality of tile sub-components;

a computing means, responsive to the specified subimage part, for computing an increased amount of tile sub-components of one or more of said tiles needed from the source in order to achieve the increased quality level of the specified subimage part of said image; and a communication means, responsive to the computed amount, for providing a message to the source indicative of the increased amount of tile sub-components so as to allow the source to conveyed further image data of the image including the increased amount of tile sub-components to the communication device.

The communication device can be a mobile terminal, a communicator or the like.

The specifying means can be a coordinate provider, such as a global positioning system (GPS) receiver for locating of the subimage part.

The present invention further provides an algorithm for use in a target device in a wireless communications network, wherein the network comprises at least a source device capable of conveying image data of an image having an initial quality in a codestream to the target device, and the target device comprises:

a memory means to store at least a portion of the image conveyed in the codestream;

a displaying means, operatively connected to the memory means, for displaying part or all of said at least portion of the conveyed image;

a specifying means, operatively connected to the displaying means, for allowing a user to specify from the displayed image a subimage part of the conveyed image for display at an increased quality level greater than said initial quality of the image stored in the memory means, wherein the image is composed of a plurality of image tiles, each image tile comprising a plurality of tile sub-components; and a communication means for communicating with the source device. The algorithm comprises:

a first code, based on the specified subimage part, for computing an increased amount of tile sub-components of one or more of said tiles needed from the source device in order to achieve the increased quality level of the specified subimage part of said image; and a second code, for removing at least a part of the stored portion of the conveyed image in the memory means so as to allow the increased amount to be stored in the memory, wherein the communication means, responsive to the computed amount, provides a message to the source device indicative of the increased amount of tile sub-components so as to allow the source device to conveyed further image data of the image including the increased amount of tile sub-components to the target device.

In yet another aspect of the present invention, the source is physically connected to the target and the communication link between the source and the target is a data link subject to the constraints typical of a mobile device. For example, the target is a mobile multimedia device and the source is a memory card, which can be inserted in the mobile multimedia device. The memory card contains one or more high-quality, high-resolution images, maps or the like, so that the user can pan through one of these images or maps in order to view the details of a sub-area. Accordingly, the present invention provides yet another method of conveying image data of an image having an initial quality in a data stream between a source and a target linked in a constrained connection, where the target has a memory means to store at least a portion of the image conveyed in the data stream. The method comprises the steps of:

selecting in the target a subimage part of said image for display at an increased quality level greater than said initial quality of the image stored in the memory means, wherein the image is composed of a plurality of image tiles, each image tile comprising a plurality of tile sub-components, and providing a message to the source from the target indicative of an increased amount of tile sub-components of one or more of said tiles needed from the source in order to achieve the increased quality level of the selected subimage part of said image so as to allow the source to convey further image data of the image in the data stream including the increased amount of tile sub-components in response to the message.

Preferably, the target comprises a memory card reader and the source comprises a memory card for use in the memory card reader.

In a further aspect, the present invention provides a mobile multimedia device having a source reader to accommodate at least a source, the source capable of conveying image data of an image having an initial quality in a data stream to the mobile multimedia via the source reader. The multimedia device comprises:

a memory means to store at least a portion of the image conveyed in the data stream;

a displaying means, operatively connected to the memory means, for displaying part or all of said at least portion of the conveyed image;

a specifying means, operatively connected to the displaying means, for allowing a user to specify from the displayed image a subimage part of the conveyed image for display at an increased quality level greater than said initial quality of the image stored in the memory means, wherein the image is composed of a plurality of image tiles, each image tile comprising a plurality of tile sub-components;

a computing means, responsive to the specified subimage part, for computing an increased amount of tile sub-components of one or more of said tiles needed from the source in order to achieve the increased quality level of the specified subimage part of said image; and a communication means, responsive to the computed amount, for providing a message to the source indicative of the increased amount of tile sub-components so as to allow the source to convey further image data of the image including the increased amount of tile sub-components to the multimedia device.

The present invention will become apparent upon reading the description taken in conjunction of FIGS. 4 to 12.

BRIEF DESCRIPTION OF THE DRAWINGS

FIG. 1 is a schematic representation showing typical formation of tiles in a JPEG 2000 image.

BEST MODE FOR CARRYING OUT THE INVENTION

The present invention makes use of the fact that the JPEG2000 compression system employs tiling to compress an image. Tiling involves dividing the image into equal-sized rectangular areas, with the possible exception at the borders. The tiles correspond to areas inside the image, as shown in FIG. 1. Wavelet decomposition is then performed independently over each tile. The wavelet-transformed data in each tile is entropy coded using a context-based arithmetic encoder. The resulting binary data is then arranged to form a codestream. In order to obtain a scalable codestream, bitstreams generated from tiles are divided into tile-parts or sub-components. A JPEG2000 bitstream of an image can be viewed as being composed of many "sub-streams", each one of which corresponds to a particular spatial region, quality, resolution or color component of the image. In particular, each of these sub-streams corresponds to data pertinent to a particular parameter of the image system. These standard parameters include:

1. Tile
2. Resolution
3. Layer
4. Packet
5. Block.

For example, a particular piece of the bitstream may correspond to coded data of a particular tile only. The tile data may further be composed of data corresponding to quality layers within the tile, and to different resolution levels within those layers. This form of coding and packetizing the data is achieved through the concept of scalability fully supported by the JPEG2000 standard.

There are a number of possible ways to form a valid JPEG2000 bitstream, such as:

1. LRCP
2. RLCP
3. RPCL
4. PCRL
5. CPRL.

Here LRCP means that the tile data is composed of layer (L) data. Each layer data is composed of resolution (R) data. Each resolution data is composed of color component (C) data, and so on. For image surfing applications, it is preferable to use the LRCP format. It means that the image data can be divided in the following manner:

$$T \supset L \supset R \supset C \supset P$$

Figure 2:
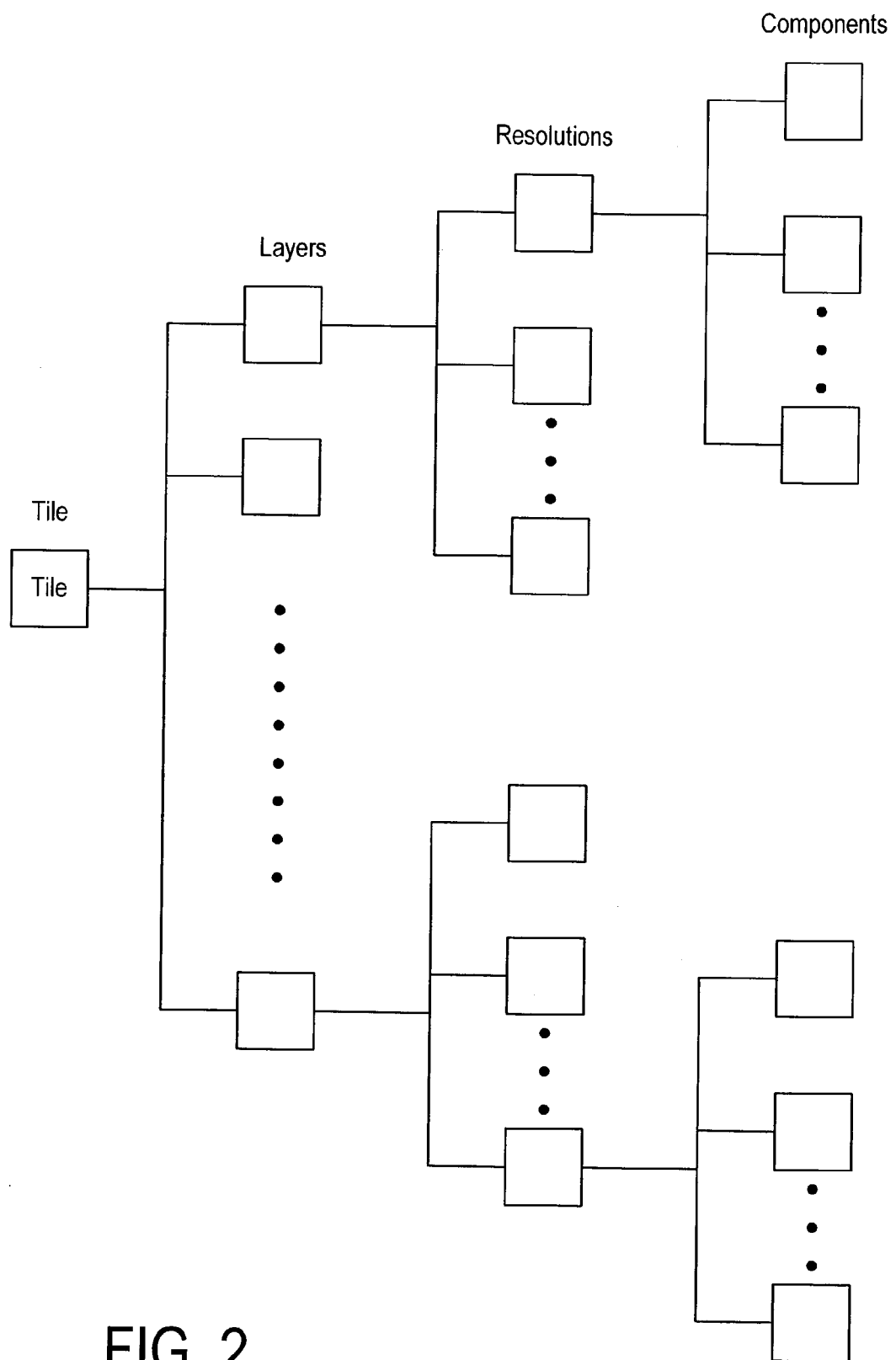
FIG. 2 is a schematic representation showing the sub-components in a tile.

The bitstream composition of in the LRCP format is schematically illustrated in FIG. 2.

Figure 3:
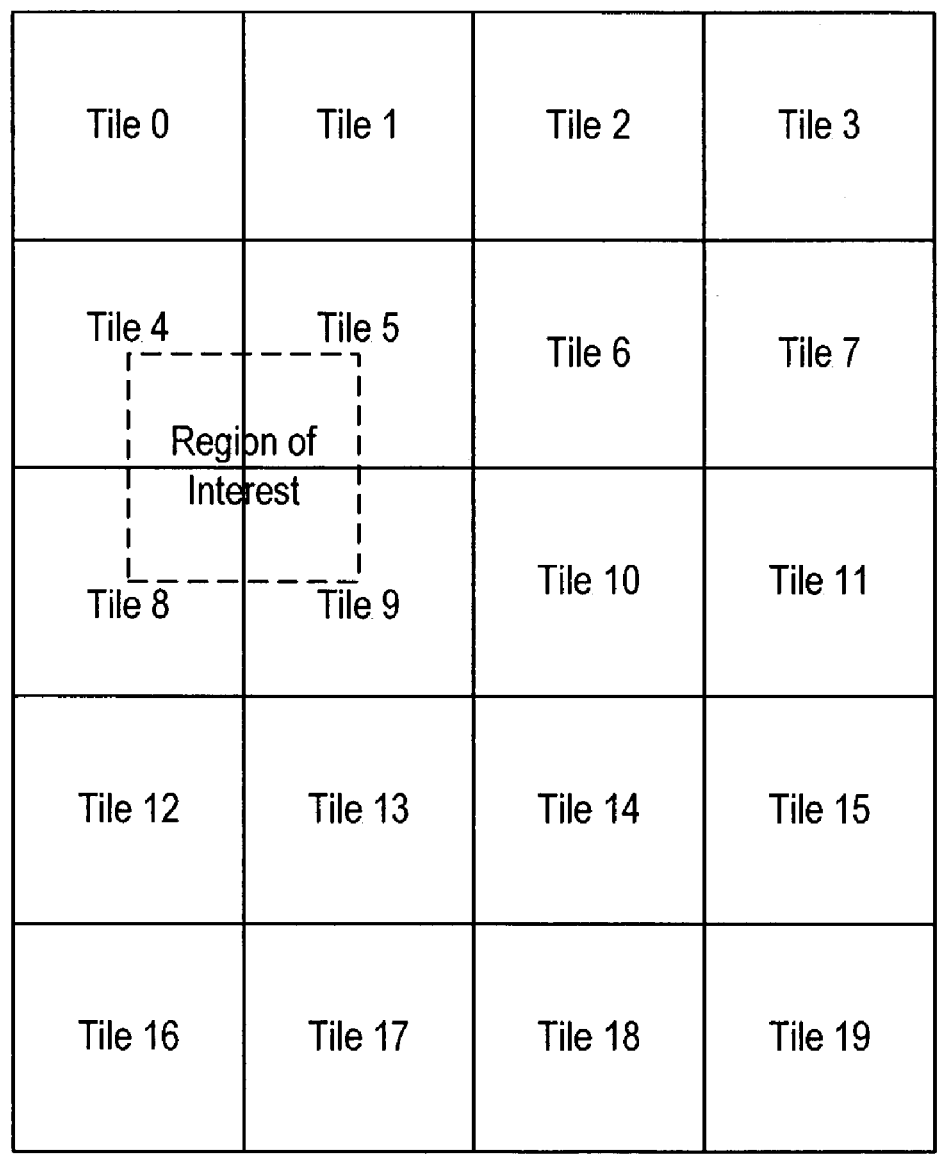
FIG. 3 is a schematic representation showing a region of interest in an image.

In order to make image surfing practical and efficient, the user should be allowed to choose a portion of an image, such as the image area bound by the region-of-interest, as shown in FIG. 3. It is preferred that the region-of-interest does not correspond to more than four tiles at a time. However, the client is allowed to pan the whole image before selecting the region-of-interest, and the client can view the image area within a region-of-interest with a certain resolution and quality by requesting that the server send the minimum required compressed data to satisfy the viewing requirement, while restricting the sent codestreams to be a legal JPEG2000 codestream.

Sending the minimum required data to satisfy the client request means reducing the network data required for transmission as well as reducing the memory required to store the data at the client.

Preferred Operation Mode

Figure 4:
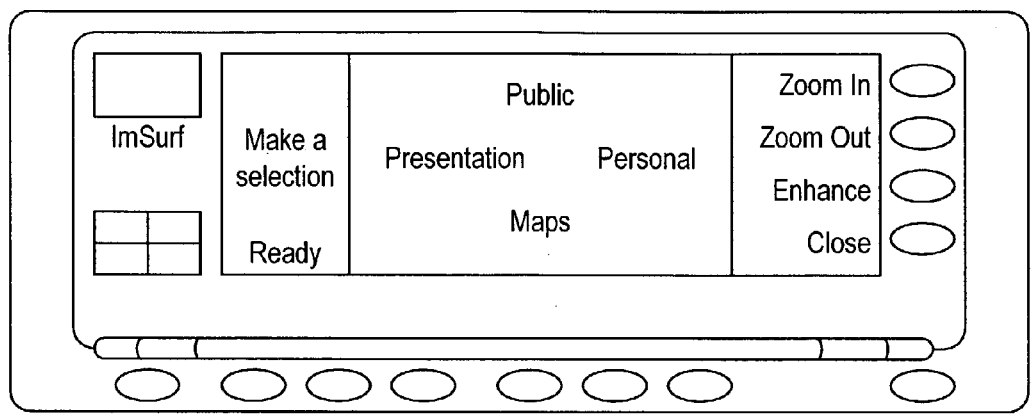
FIG. 4 is a schematic representation showing a mobile device being used for image surfing.
Figure 5:
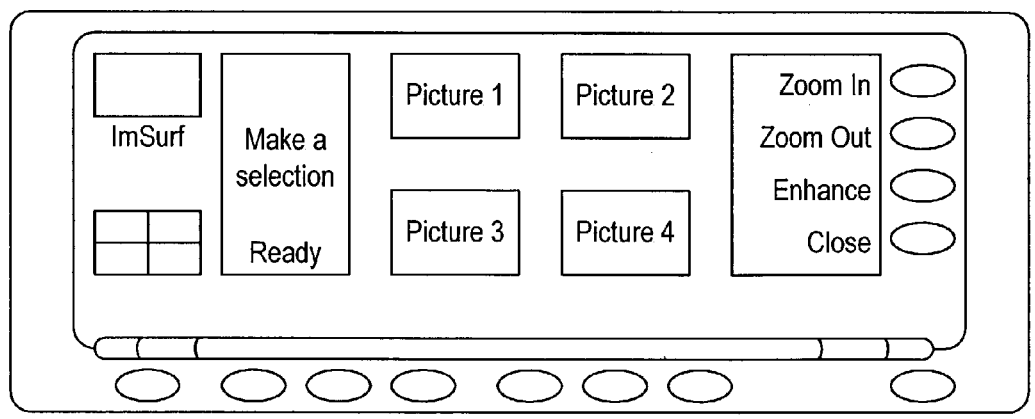
FIG. 5 is a schematic representation showing a number of thumbnail images selectable by the user in image surfing.

In order to carry out an image surfing application, the client in a wireless network must be connected to a server that contains JPEG2000 images. The client can be a stand-alone application or a browser. The server can be a dedicated server or an HTTP (Hyper-Text Transport Protocol) server. The images residing in the server are compressed by JPEG2000 using the method of tiling. A typical operational sequence of an image surfing application is shown below:

1. The client wishing to surf JPEG2000 images first connects to the server.
2. Once connected, the client sees different categories of images to surf from, as shown in FIG. 4. Some of the categories may be public while others may be private, i.e., they may be accessible only to the particular clients.
3. The client then sends its choice of the image category for surfing. The capabilities of the client, such as memory and display constraints, may also be sent to the server at this time.
4. Responding to the client request, the server sends a set of thumbnails representing the images residing in the server under that particular category, as shown in FIG. 5.
5. The client selects an image to surf.
6. The server retrieves the requested image and, based on the client's capabilities, sends data that fits optimally with the client's framework. The initial image data that the server sends to the client represents a thumbnail of the image. The data is extracted from the same original JPEG2000 codestream of the image. Only the low-resolution level or levels of the image are extracted. The data is organized as a JPEG2000 main header plus the tile parts from all the tiles of the image corresponding to the required resolution and satisfying the client's capabilities.
7. At the client side, the received response is plugged into a JPEG2000 decoder and the image thumbnail is displayed. In additional to the image thumbnail, the server may also send metadata about the image, such as information about the author, the creation date, image dimension, file size, EXIF (Exchangeable Image File Format) information, etc., and annotations describing the image. This additional information may also be displayed at the client along with the thumbnail.

The client has a GUI interface by which the user can move a selection box, over the displayed thumbnail. When the user wishes to view a particular region of the image, he selects the region-of-interest using the selection box. A request containing the coordinates, quality and resolution of the selected region, is sent to the server.

Figure 6:
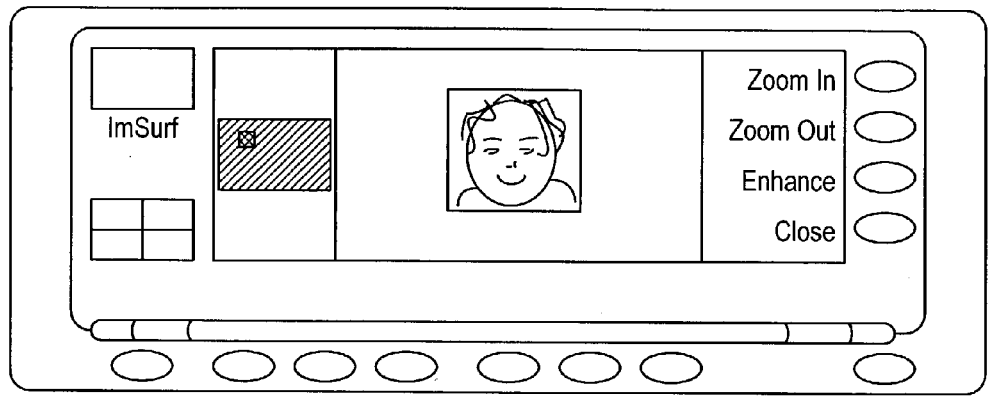
FIG. 6 is a schematic representation showing a region of interest in a thumbnail image.

8. Based on the client's request, the server parses the relevant JPEG2000 codestream; extracts the necessary tile-parts that satisfy the capabilities of the client; and forms a response to send to the client.
9. At the client, the received data is appended after the residing thumbnail data in order to form a legal JPEG2000 codestream. This composite data is conveyed to the JPEG2000 decoder and the requested region is displayed on the client's screen, as shown in FIG. 6.

If the user wishes to zoom in, zoom out, or enhance the quality of the viewed area, the client sends a request with new parameters. Responding to the new parameters, the server extracts the relevant tile parts from the codestream and sends the data back to client. The client again appends the data to the residing bitstream to form a legal JPEG2000 codestream to be conveyed to the decoder.

Figure 7:
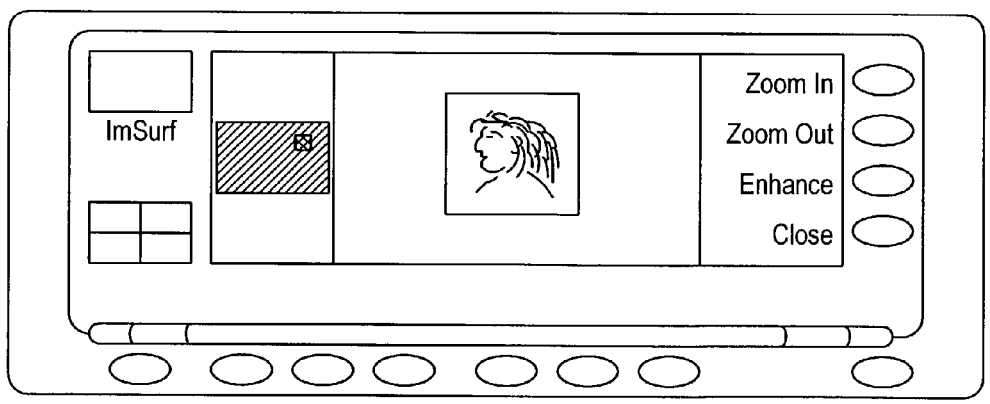
FIG. 7 is a schematic representation showing another region of interest in the thumbnail image.
Figure 10:
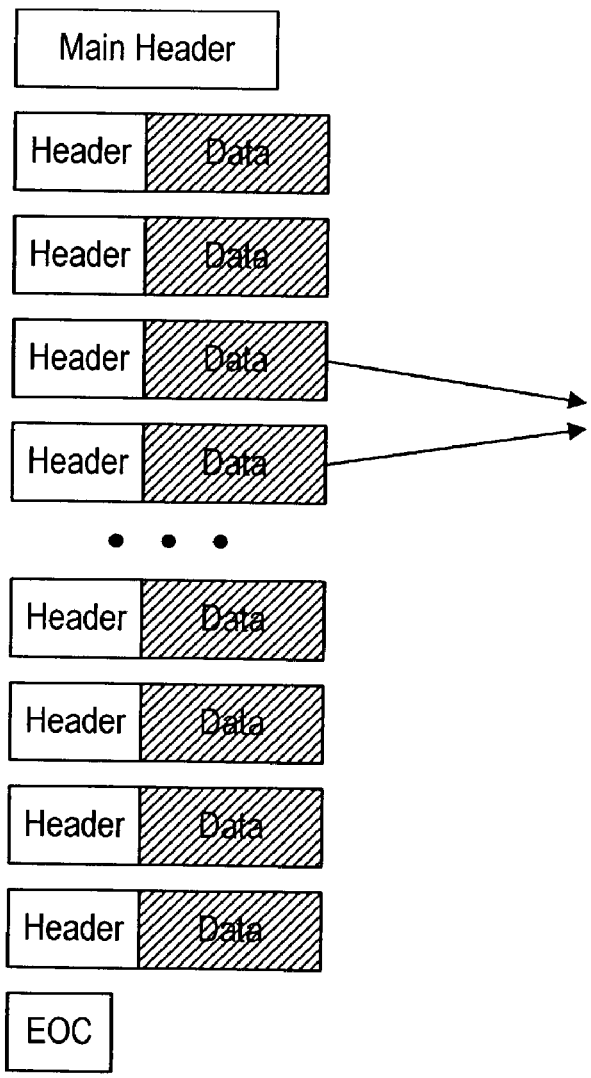
FIG. 10 is a schematic representation showing JPEG2000 codestream formation at the server.
Figure 11:
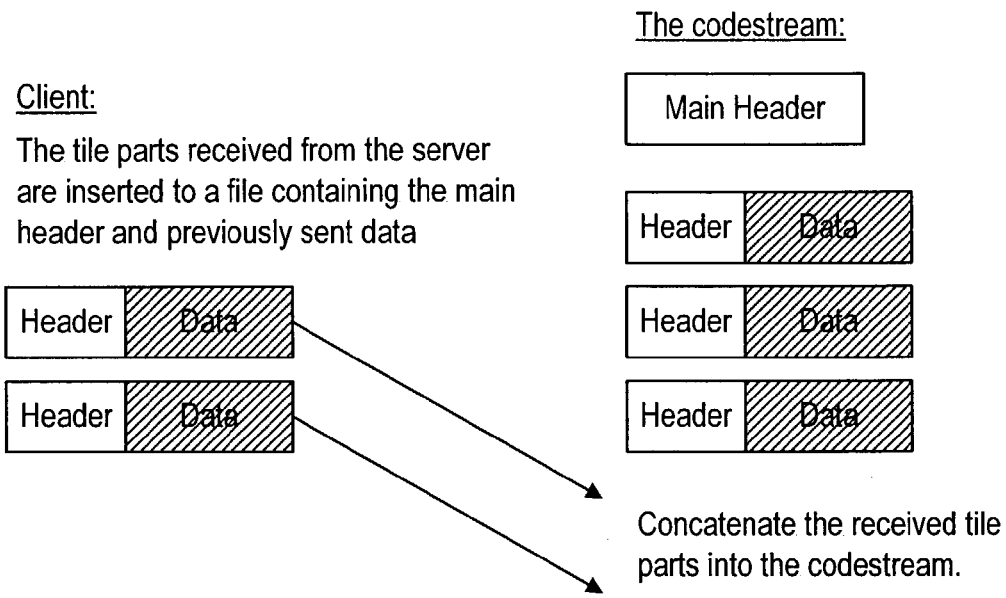
FIG. 11 is a schematic representation showing JPEG2000 codestream formation at the client.
Figure 12:
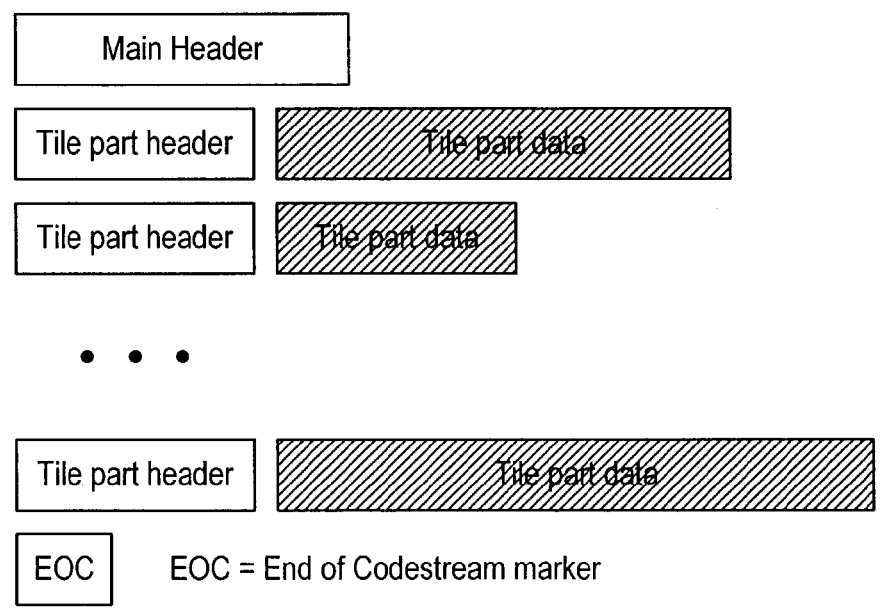
FIG. 12 is a schematic representation showing composition of a JPEG2000 codestream.

10. When the client pans to another area of the thumbnail, a new request is sent to the server as if an entirely new region-of-interest is requested. The server retrieves the necessary tile parts satisfying the new request and sends them to the client. If the newly requested area does not overlap with the earlier region-of-interest, the client can delete the old data in its memory. The only part that should not be deleted is the image main header, which is always used in order to form a legal JPEG2000 codestream. Appending of the new data after the residing thumbnail data is always performed after main header, as shown in FIGS. 10–12. This new composite data is conveyed to the JPEG2000 decoder and the newly requested region is displayed on the client's screen, as shown in FIG. 7.

During the viewing steps, the client can save any part of the image in the device and view it later without re-establishing connection with the server. The saved image is a valid JPEG2000 image, which can be decoded by the JPEG2000 decoder residing in the client.

Using the above-described technique, the client can pan through any high-quality, high-resolution image residing in the server, and view the details of the image at any desirable quality and resolution on the constrained mobile multimedia device. The device does not have to download or decode more than its capabilities allow. The requests can be expressed in a standard HTTP format, or in a proprietary binary format.

Figure 8:
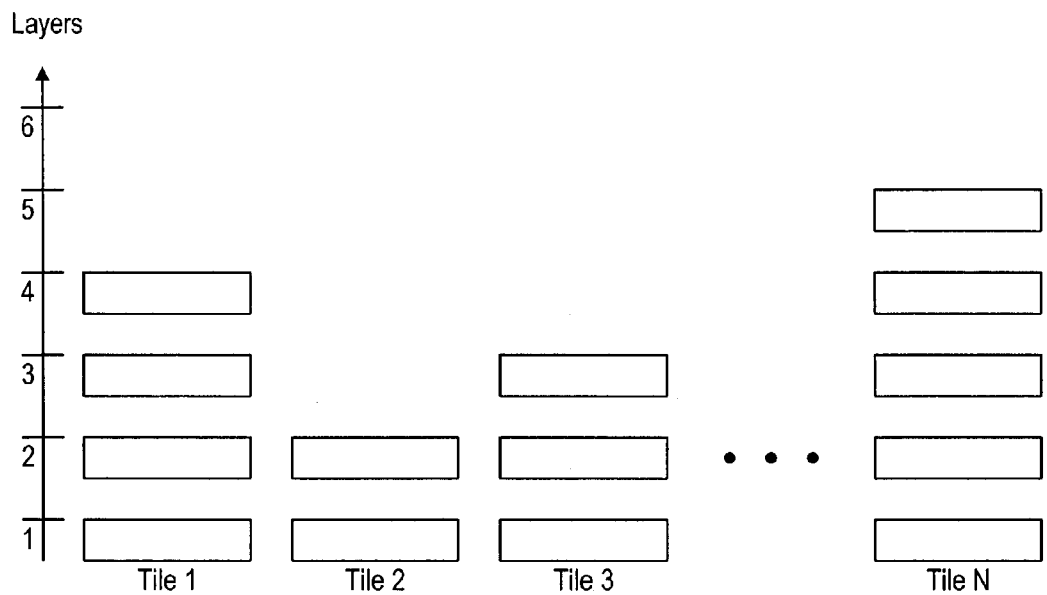
FIG. 8 is a schematic representation showing the tile data stored in the memory of a client device.

As mentioned earlier, image data can be broken down to tile data, layer data, resolution data and component data. However, in order to make image surfing efficient by making use of the cache memory, it is preferable to separate these data segments up to the L level only. Coded data for the image is stored separately in cache for each tile in the image. In other words, each tile data corresponds to a separate location in the cache memory. Furthermore, each layer data within a tile data is also separately stored in distinct locations in cache, as shown in FIG. 8. As such, various segments of the coded image data can be manipulated individually, whether certain segments are deleted, concatenated or accessed.

When a user surfs a particular region of the image, the image surfing application first checks to see whether or not the data requested by the user is already in the client. Note that a region requested by the user may correspond to one to four tiles. If the required data is not present, the client sends a request to the server in order to retrieve the data for the particular tile. The data for the tile or tiles comes back in the form of layers. Each of the distinct layer data is stored in cache in their respective locations. By storing the various quality layers separately for each tile, the application is able to retrieve the desired tile and quality layer data as the user surfs the JPEG2000 image.

It is possible that only part of the required data may be available in cache. In that case, the application only requests the part of the data that is not present in the cache. This reduces the amount of the data that the server has to send back to the client. When the client receives the "missing" data, it places them in the appropriate location in the memory cache.

Figure 9:
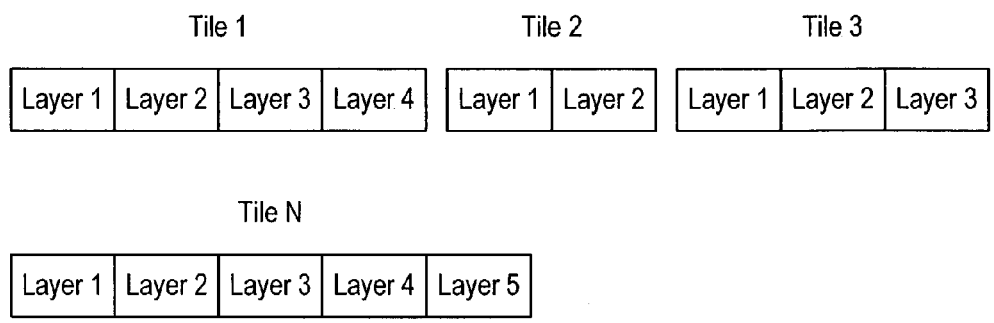
FIG. 9 is a schematic representation showing the code-part formation of the JPEG bitstream from the layer data.

Once the application ascertains that all the necessary data parts are available, it picks them up from the memory cache and arranges them in the proper order so that the resulting bitstream always corresponds to a valid JPEG2000 bitstream. Because of the way the data is stored in segments in the cache, this final JPEG2000 bitstream formation turns out to be a very simple procedure. As illustrated in FIG. 9, all it requires is to select the tile data for the tiles that cover the requested region and to concatenate the selected tile data in a memory buffer. The tile data contains layer data up to the layers that are requested by the user.

The final bitstream that is formed in the buffer is always a valid JPEG2000 bitstream. This bitsream is then fed to the JPEG2000 decoder in the Image Surfing application, which decodes it and displays the requested region on the device screen (see FIGS. 6 and 7).

Cache Management

If the cache memory space in the mobile multimedia device is limited and short in supply, it may be necessary to impose an upper limit on the amount of cache memory available to store the image data. In this case, some kind of cache management strategy is needed to manage the data in the cache. Specifically, the cache management system must be able to make room for new data as it is made available. It must be able to decide which part of the image data bank is of lower importance and release it to make room for new data. In short, it must be an intelligent cache management system.

Strategy

As new image data becomes available to the client, it must be stored in the cache memory. As long as there is room in the cache memory, there is no problem. However, as soon as the cache memory limit is reached, accommodating the new data into the cache memory becomes a problem. It is imperative that if the new data is to be accommodated, then part of the data already residing in cache must be released.

A crucial issue here is the capability to figure out which part of the data must be deleted to make room for new data. Two factors that contribute to such an assessment are listed below:

1. Euclidean Distance

In applications such as image surfing, panning or surfing usually moves from one adjacent tile (or region) to another. Big jumps in the selected region of interest are less frequent than panning adjacent tiles. This is because areas around the selected region are more likely to be browsed by the user than distant isolated ones. In other words, image data corresponding to regions furthest from the current region are likely to be of lower interest to the user. Hence, image data corresponding to regions that are further away from the current region should be removed first before removing image data corresponding to closer regions.

2. Layer Level

As far as the human perception of data is concerned, not every part of the image data is of equal importance. For the purposes of image surfing, image data that is in higher layers is of less importance than the image data that is lower layers. This is because data in lower layers carries more information and contributes to a larger decrease in distortion, both arithmetic and visual, as compared to data in higher layers. Hence, it would make sense to delete higher layers before lower layers in order to make room for new data.

Algorithm

Based on the strategy described above, an efficient algorithm for managing the cache memory is presented below:
Let:
$C_{max}$ be the maximum cache buffer size in bytes;
$C_{cur}$ be the current cache memory size in bytes that has been filled up with image data;
$L_h$ be the highest layer of image data available for a particular tile; and
$L_l$ be the minimum acceptable layer to be kept in cache memory for a particular tile, then 1) For all tiles with decreasing Euclidean distance from the current tile
 (i) If $L_h > L_l$
  Remove $L_h$ and decrement $L_h$ by 1.
  If $C_{cur} < C_{max}$
   ◆Break
  Else
   ◆Go to 1(i)
2) If $C_{cur} > C_{max}$
 (i) Decrease $L_l$ by 1 and start over from (1) above.

The above algorithm offers an efficient mechanism for managing the cache memory within the physical limits of the system.

The JPEG2000 codestream formation at the server is illustrated in FIG. 10. It shows how the server retrieves the relevant tile parts and sends them to the client upon request.

FIG. 11 shows how the data received by the client is appended to the codestream before the codestream is conveyed to a JPEG2000 decoder. FIG. 12 shows a scalable JPEG2000 codestream, which is formed using tiling and comprises tile parts.

The present invention can be implemented in two modules:

1. Server—A server containing JPEG2000 compressed images and an engine for interpreting and serving client's requests. The server can be a) an independent, dedicated image server, such as Club Nokia, which contains personal images, news images, sports images, maps, etc., to which the user would connect for image surfing, and b) an HTTP server supporting the protocol for communication between the client and the server. The protocol is suitable for transmitting requests from the client to the server, and transmitting services from the server to the client, according to the client's capabilities.
2. Client—A client containing a JPEG2000 decoder and a bitstream parser to process incoming binary data. The client can be a) a stand-alone GUI (graphic user interface) application, which the user can use to browse and surf images in the server, by making use of its user interface, and b) a plug-in for a browser, the inherited properties (searching, caching, etc.) of which can be exploited in addition to image surfing. The client must also have an engine, which is capable of decoding images partially and fully with low memory and complexity requirements, and rendering user Interface Interactions with the images (zoom, pan, enhancement) to form the necessary requests for transmission to the image server.

The present invention renders it possible for remote devices to access all the contents of high-resolution images with low capabilities (memory, bandwidth and computation power). The invention also decreases the amount of data needed to load and decode in order to view a certain area of an image. As legal JPEG2000 codestreams are generated at the remote devices, extra pre-processing and post-processing of codestreams is not required. With this JPEG2000 client-server architecture, there is no need to have multiple codestreams at the server. A single codestream is sufficient to serve all types of client requests.

The method and system for image surfing, according to the present invention have been disclosed in terms of communications between a server and a client. However, the server can be viewed as a source device and the client a target device. In that respect, the terms server and source are interchangeable, as are the terms client and target.

It should be noted that the method of image surfing, as described in conjunction with FIGS. 5 to 7, allows a user to select one of a plurality of thumbnails for image surfing purposes. However, thumbnails are useful but not necessary. For example, if a user requests a map of a certain area from a remote tourist bureau or a web-map provider, the user may get the map of a very large area downloaded in the user's mobile phone. Based on the downloaded map, the user may choose to see an enlarged map of a certain local area. Upon receiving a request from the user, the tourist bureau conveys to the user only the increased amount of tile sub-components so as to allow the mobile phone to reconstruct the map of the interested area with a selected resolution. In this scenario, one larger image is used to replace a plurality of smaller thumbnails. Moreover, although the user can use a selection box to select an area of interest, the user can also specify the area of interest by naming a certain town, a certain landmark or a junction between two or more roads on the map. It is also possible for the user to reveal the location of interest from GPS (Global Positioning System), provided that the client device has GPS capability. As such, a lower quality image can be provided to the client device via a wireless link or a web link so as to allow the user to start image surfing based on the lower quality image.

Furthermore, it is possible that the user inserts into a mobile multimedia device a memory card (or the like) containing one or more high-quality, high-resolution images, maps or the like, so that the user can pan through one of these images or maps in order to view the details of a sub-area. Because of the memory and computing power constraints in the mobile multimedia device, it is impractical or even impossible to load an entire, large image into the device memory. Thus, it is generally practical to display an image of lower quality for image surfing purposes. After the user selects the sub-area, more image data will be retrieved from the memory card and loaded into the device memory so that the image of the sub-area can be displayed with desirable quality and resolution. In this example, the source is operatively connected to the target within a mobile multimedia device, and the connection between the source and the target is not wireless but subject to the constraints in the multimedia device.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of conveying image data of an image having an initial quality in a codestream between a source and a target in a wireless communications network, wherein the image is composed of a plurality of image tiles, each image tile comprising a plurality of tile sub-components organizable in a parametric order, and wherein the target has a memory means to store at least a portion of the image conveyed in the codestream, the image stored in the target including tile sub-components in one or more image tiles, said method comprising:

arranging at least part of the memory means into a plurality of memory locations in cache so as to allow the image data of the tile sub-components in each of said one or more tiles to be stored in a different location of said memory means according to the parametric order;

selecting in the target a subimage part of said image for display at an increased quality level greater than said initial quality of the image stored in the memory means, providing a message to the source from the target indicative of an increased amount of tile sub-components of said one or more image tiles needed from the source in order to achieve the increased quality level of the selected subimage part of said image so as to allow the source to convey further image data of the image in the codestream including the increased amount of tile sub-components in response to the message;

specifying in the target a further subimage part of said image for display at said increased quality level, wherein said specified further subimage part is at least partially different from the selected subimage part, providing a further message to the source from the target indicative of a further amount of tile sub-components of one or more of said tiles needed from the source in order to achieve said increased quality of the specified further subimage part so as to allow the source to convey additional image data of the image in the codestream including the further amount of tile sub-components in response to the further message; and deleting the image data of said at least portion of the non-selected part from one or more locations of said memory means, wherein said at least portion of the non-selected part includes image data of tile sub-components in some of said one or more image tiles, and wherein said deleting is partially based on the distance between the tiles in said at least portion of the non-selected part and the further subimage part.

2. The method of claim 1, further comprising:

receiving the further image data in the target, the received further image data comprising increased amount of tile sub-components of said one or more image tiles corresponding to the stored image data of the tile sub-components in said one or more image tiles; and storing the received increased amount of tile sub-components in each of said one or more image tiles separately in the memory means in the location of the corresponding stored image data.

3. The method of claim 1, wherein the further image data conveyed by the source comprises increased amount of tile sub-components of said one or more image tiles corresponding to the stored image data of the tile sub-components in said one or more image tiles in a non-overlapping manner.

4. A communication device in a wireless communications network, the communications comprising at least a source capable of conveying image data of an image having an initial quality in a codestream to the communication device, wherein the image is composed of a plurality of image tiles, each image tile comprising a plurality of tile sub-components organizable in a parametric order, said communication device comprising:

means for storing at least a portion of the conveyed image data including tile sub-components in one or more image tiles, the memory module arranged into a plurality of memory locations in cache so as to store the image data of the tile sub-components in each of said one or more tiles in a different location of said memory means according to the parametric order;

means for selecting a subimage part of said image for display at an increased quality level greater than said initial quality of the image stored in the memory means, means for providing a message to the source indicative of an increased amount of tile sub-components of said one or more image tiles needed from the source in order to achieve the increased quality level of the selected subimage part of said image so as to allow the source to convey further image data of the image in the codestream including the increased amount of tile sub-components in response to the message; and means for specifying a further subimage part of said image for display at said increased quality level, and said specified further subimage part is at least partially different from the selected subimage part, wherein the providing means is adapted to provide a further message to the source indicative of a further amount of tile sub-components of one or more of said tiles needed from the source in order to achieve said increased quality of the specified further subimage part so as to allow the source to convey additional image data of the image in the codestream including the further amount of tile sub-components in response to the further message, and the storing means is adapted to delete the image data of said at least portion of the non-selected part from one or more locations, said at least portion of the non-selected part including image data of tile sub-components in some of said one or more image tiles, and said deleting is partially based on the distance between the tiles in said at least portion of the non-selected part and the further subimage part.

5. The communication device of claim 4, comprising a mobile terminal.

6. The communication device of claim 4, comprising a mobile multimedia device.

7. The communication device of claim 4, wherein the selecting means comprises a selection box for allowing a user to specify the subimage part of the conveyed image by moving said selection box.

8. The communication device of claim 4, wherein the selecting means comprises a coordinate provider locating of the subimage part.

9. The communication device of claim 8, wherein the coordinate provider comprises a global positioning system (GPS) receiver.

10. The communication device of claim 4, wherein the further image data conveyed by the source comprises increased amount of tile sub-components of said one or more image tiles corresponding to the stored image data of the tile sub-components in said one or more image tiles in a non-overlapping manner.

11. An image surfing system for use in a wireless communications network comprising at least a source and a target, the source capable of conveying image data of an image having an initial quality in a codestream to the target, wherein the image is composed of a plurality of image tiles, each image tile comprising a plurality of tile sub-components organizable in a parametric order, said system comprising:

a memory module in the target for storing at least a portion of the conveyed image data including tile sub-components in one or more image tiles, the memory module arranged into a plurality of memory locations in cache so as to store the image data of the tile sub-components in each of said one or more tiles in a different location of said memory means according to the parametric order;

a mechanism in the target for selecting a subimage part of said image for display at an increased quality level greater than said initial quality of the image stored in the memory means, and means for providing a message to the source indicative of an increased amount of tile sub-components of said one or more image tiles needed from the source in order to achieve the increased quality level of the selected subimage part of said image;

means in the source, in response to the message, for selecting the further image data of the image in the codestream including the increased amount of tile sub-components for conveying to the target;

means in the target for specifying a further subimage part of said image for displaying at said increased quality level, and said specified further subimage part is at least partially different from the selected subimage part, wherein the providing means in the target is adapted to provide a further message to the source indicative of a further amount of tile sub-components of one or more of said tiles needed from the source in order to achieve said increased quality of the specified further subimage part so as to allow the source to convey additional image data of the image in the codestream including the further amount of tile sub-components in response to the further message, and the memory module in the target is adapted to delete the image data of said at least portion of the non-selected part from one or more locations, said at least portion of the non-selected part including image data of tile sub-components in some of said one or more image tiles, and said deleting is partially based on the distance between the tiles in said at least portion of the non-selected part and the further subimage part.

12. The image surfing system of claim 11, wherein the further image data conveyed by the source comprises increased amount of tile sub-components of said one or more image tiles corresponding to the stored image data of the tile sub-components in said one or more image tiles in a non-overlapping manner.

* * * * *